J. L. ROUTIN.
MEANS FOR COLLECTIVELY ACTUATING AND CONTROLLING ALTERNATING CURRENT MOTORS.
APPLICATION FILED DEC. 16, 1912.
1,090,568. Patented Mar. 17, 1914.
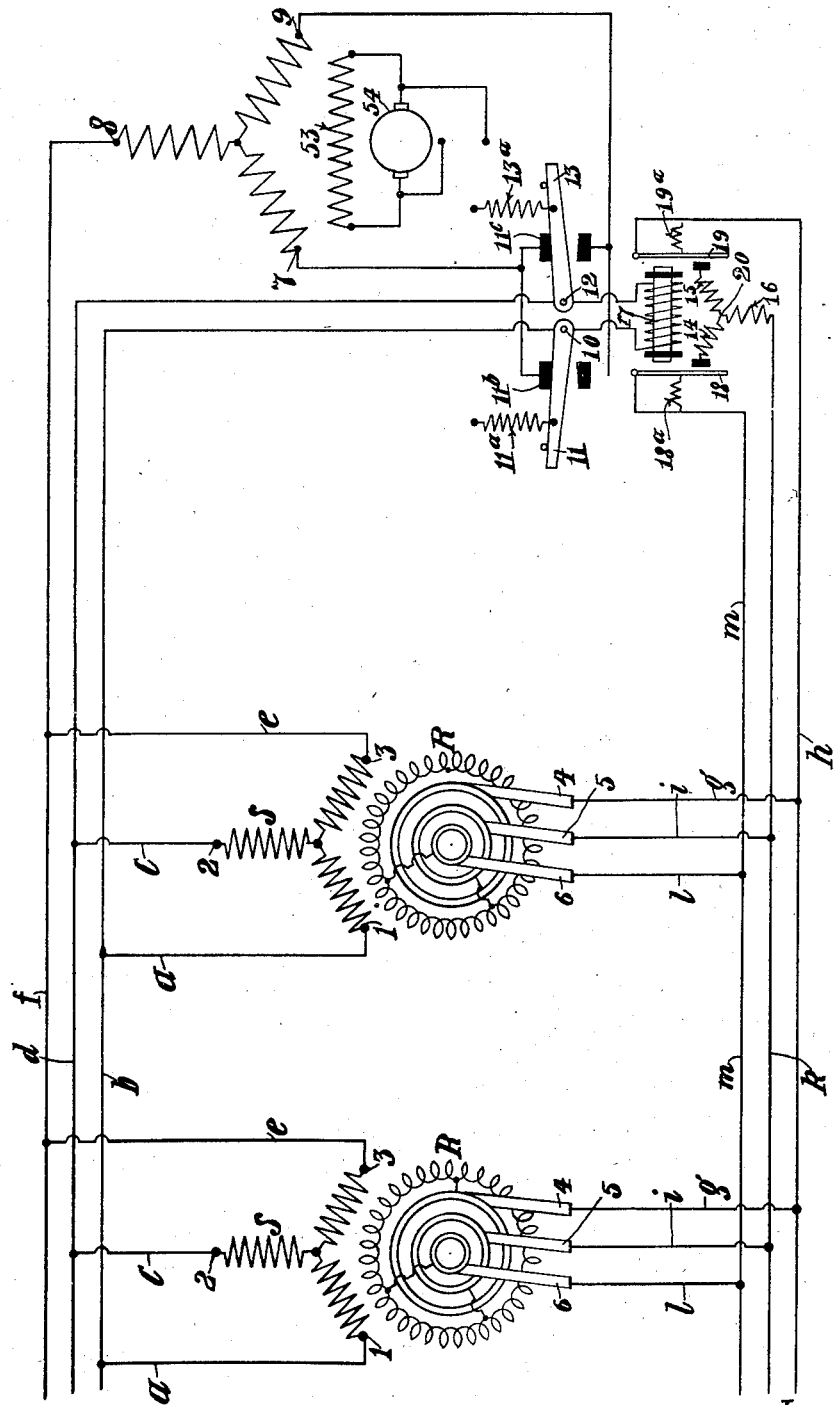
Witnesses
Inventor
Joseph Louis Routin
by *Attorney*

UNITED STATES PATENT OFFICE.

JOSEPH LOUIS ROUTIN, OF PARIS, FRANCE.

MEANS FOR COLLECTIVELY ACTUATING AND CONTROLLING ALTERNATING-CURRENT MOTORS.

1,090,568.  Specification of Letters Patent.  Patented Mar. 17, 1914.

Application filed December 16, 1912. Serial No. 737,067.

*To all whom it may concern:*

Be it known that I, JOSEPH LOUIS ROUTIN, a citizen of the French Republic, residing at Paris, in France, have invented certain new and useful Improvements in Means for Collectively Actuating and Controlling Alternating-Current Motors, of which the following is a specification.

The object of this invention is to provide improved means for collectively actuating and controlling alternating current motors, for the purpose of imparting equal rotations to several receiving shafts separated from one another.

The invention is particularly applicable for controlling gun mechanism on board warships.

The invention is illustrated in the accompanying drawing, which is a diagram showing the whole of the installation.

In the drawing, only two receivers are shown, but there may be any number of such receivers. Each receiver comprises a three phase asynchronous motor, having a stator S whereof 1, 2 and 3 are the terminals, and a rotor R, on the slip-rings of which lie brushes 4, 5, 6. The stators are fed in parallel by a triphase alternator the terminals of which are indicated by 7, 8, 9, and the field coil 53 of which is excited by means of a dynamo 54. All the terminals 1 are connected by wires $a$ to a wire $b$, and the latter is connected to the pivot 10 of a switch lever 11. All the terminals 2 are connected by wires $c$ to a wire $d$, and the latter is connected to the pivot 12 of a switch lever 13.

By operating the switch levers 11 and 13 each of the groups of terminals 1 or 2 can be connected either to terminal 7 or to terminal 9. When in the non-working position, that is the position illustrated in the diagram, the levers 11 and 13 are held by springs $11^a$, $13^a$ against contacts $11^b$, $11^c$ connected to the terminal 7. All the terminals 3 are permanently connected to the terminal 8, by means of wires $e$ and a wire $f$. All the brushes 4 are connected by wires $g$ to a wire $h$; the brushes 5 are connected by wires $i$ to a wire $k$, and the brushes 6 are connected by wires $l$ to a wire $m$. The wire $k$ is permanently connected to the coil 16 of a triphase rheostat 20. The wires $m$ and $h$ are connected to armatures 18 and 19 respectively, arranged to make contact with the terminals of the coils 14 and 15 of the rheostat 20, but springs $18^a$ and $19^a$ normally hold the said armatures out of contact with the said terminals. Between the armatures 18 and 19 there is an electromagnet 17, the coil of which is connected to the pivots 10 and 12, and excitation of this magnet causes the armatures to be pulled into contact with the terminals of the coils 14 and 15.

The operation is as follows: In the position of non-working illustrated in the diagram, the stators S are fed by single phase current, the circuits of the rotors are connected together and the rheostat is out of circuit. Immediately the alternator is excited the rotors automatically assume similar positions with regard to their respective stators and are electrically coupled; any displacement of one of them immediately develops currents in all the others which actuate them until they are in step again. When one of the levers 11, 13 of the controller is lowered, 11 for example, a rotary field is created in the stators S and at the same time the electromagnet 17 is energized, and attracts the armatures 18 and 19, whereby the rheostat 20 is put into operation. All the receivers will then turn in the same direction and at the same speed since the rotors remain coupled in parallel. When the lever 11 is released the rotors R can continue to turn for a brief space in monophase, but the torque will cease immediately the armatures 18 and 19 are released and break contact.

What I claim as my invention and desire to secure by Letters Patent of the United States is:—

1. The combination, with a polyphase electric current generator, of a plurality of asynchronous motors each having a rotor and a stator, conducting means connecting said generator to the stators of said motors, means controlling said conducting means whereby said stators can be supplied from said generator with monophase current and polyphase current alternatively, and conducting means connecting the phase windings of the several rotors, whereby current generated by rotation of any of said rotors is transmitted to the other rotors and produces synchronous rotation thereof.

2. The combination, with a polyphase electric current generator, of a plurality of asynchronous motors each having a rotor and a stator, conducting means connecting said generator to the stators of said motors, switch mechanism controlling said conducting means whereby said stators can be supplied from said generator with monophase current and polyphase current alternatively, conducting means connecting the phase windings of the several rotors, whereby current generated by rotation of any of said rotors is transmitted to the other rotors and produces synchronous rotation thereof, a rheostat, and means associated with said switch mechanism, whereby the rotors are automatically connected to said rheostat when said switch mechanism is operated for supplying polyphase current to the stators.

In witness whereof I have signed this specification in the presence of two witnesses.

JOSEPH LOUIS ROUTIN.

Witnesses:
 JOSEPH COHARD,
 HANSON C. COXE.